US009626070B2

(12) United States Patent
Cowles et al.

(10) Patent No.: US 9,626,070 B2
(45) Date of Patent: Apr. 18, 2017

(54) LOCATION BASED AUGMENTED REALITY SYSTEM FOR EXCHANGE OF ITEMS BASED ON LOCATION SENSING METHODS AND DEVICES RELATED THERETO

(71) Applicant: iOculi, Inc., Seattle, WA (US)

(72) Inventors: Jonathan Cowles, Renton, WA (US); Jesse Bryan, Seattle, WA (US); John Clem, Seattle, WA (US)

(73) Assignee: iOculi, Inc., Renton, WA (US)

( * ) Notice: Subject to any disclaimer, the term of this patent is extended or adjusted under 35 U.S.C. 154(b) by 198 days.

(21) Appl. No.: 14/348,422

(22) PCT Filed: Oct. 1, 2012

(86) PCT No.: PCT/US2012/058368
§ 371 (c)(1),
(2) Date: Mar. 28, 2014

(87) PCT Pub. No.: WO2013/049855
PCT Pub. Date: Apr. 4, 2013

(65) Prior Publication Data
US 2014/0237578 A1 Aug. 21, 2014

Related U.S. Application Data

(60) Provisional application No. 61/541,908, filed on Sep. 30, 2011.

(51) Int. Cl.
*G06F 3/0481* (2013.01)
*G06Q 10/10* (2012.01)
(Continued)

(52) U.S. Cl.
CPC ...... *G06F 3/04815* (2013.01); *G06F 3/04817* (2013.01); *G06F 3/04845* (2013.01);
(Continued)

(58) Field of Classification Search
CPC ............. G06F 3/04815; G06F 3/04817; G06F 3/04845; H04L 63/0861; H04L 65/403;
(Continued)

(56) References Cited

U.S. PATENT DOCUMENTS

| 7,054,830 B1 * | 5/2006 | Eggleston | G06Q 30/02 705/14.26 |
| 2001/0034649 A1 * | 10/2001 | Acres | G06Q 20/12 705/14.12 |

(Continued)

FOREIGN PATENT DOCUMENTS

| KR | 20110038425 A | 4/2011 |
| KR | 20110072438 A | 6/2011 |

OTHER PUBLICATIONS

International Search Report mailed Mar. 26, 2013, relating to International Patent Application No. PCT/US2012/058368 filed Oct. 1, 2012, 4 pages.

(Continued)

*Primary Examiner* — Matthew Smithers
(74) *Attorney, Agent, or Firm* — Ellen M. Bierman; Lowe Graham Jones PLLC

(57) ABSTRACT

Location-based augmented reality systems configured exchange of items based on location sensing and associated triggering icons, and methods and devices related thereto. In one exemplary embodiment, a first, provider user identifies a specific physical location; associates a triggering icon representing a value item with the specific physical location; and, transmits the existence of the triggering icon and specific physical location to a second, mobile recipient user computing device. The second, mobile recipient user receives the triggering icon and specific physical location
(Continued)

from the first, provider user computing device, then finds the specific physical location, activates the triggering icon and receives the value item.

27 Claims, 18 Drawing Sheets

(51) Int. Cl.
G06Q 30/02 (2012.01)
G06Q 50/00 (2012.01)
G06F 3/0484 (2013.01)
H04L 29/06 (2006.01)
(52) U.S. Cl.
CPC ............ *G06Q 10/10* (2013.01); *G06Q 30/02* (2013.01); *G06Q 50/01* (2013.01); *H04L 63/0861* (2013.01); *H04L 65/403* (2013.01)
(58) Field of Classification Search
CPC ........ G06Q 50/01; G06Q 30/02; G06Q 10/10; G06Q 30/0207; G06Q 30/0208; G06Q 30/0209; G06Q 30/0239; G06Q 30/0241; G06Q 30/0222; G06Q 30/0253; G06Q 30/0259; G06Q 30/0261
See application file for complete search history.

(56) References Cited

U.S. PATENT DOCUMENTS

| | | | | |
|---|---|---|---|---|
| 2007/0024527 A1* | 2/2007 | Heikkinen | ............... | A63F 13/10 345/9 |
| 2010/0268576 A1* | 10/2010 | Morris | ................... | G06Q 30/02 705/7.29 |
| 2010/0332310 A1* | 12/2010 | Russell | ................. | G06Q 30/02 705/14.36 |
| 2011/0010232 A1* | 1/2011 | Bhojwani | .............. | G06Q 30/02 705/14.17 |
| 2011/0015984 A1* | 1/2011 | Galinos | .................. | G06Q 30/02 705/14.26 |
| 2011/0053574 A1* | 3/2011 | Rice | ....................... | H04M 1/006 455/418 |
| 2011/0093515 A1* | 4/2011 | Albanese | ............... | G06Q 30/02 707/812 |
| 2011/0214082 A1 | 9/2011 | Osterhout et al. | | |
| 2011/0264527 A1* | 10/2011 | Fitzpatrick | ............. | G06Q 30/02 705/14.55 |
| 2011/0287834 A1* | 11/2011 | Lindmeir | ................ | A63F 13/10 463/29 |
| 2012/0040763 A1* | 2/2012 | Auterio | .................... | A63F 13/12 463/42 |
| 2012/0214568 A1* | 8/2012 | Herrmann | ............... | H04L 67/22 463/16 |
| 2012/0315984 A1* | 12/2012 | Carrico | ............... | G07F 17/3211 463/30 |
| 2013/0060641 A1* | 3/2013 | Al Gharabally | ....... | G06Q 30/02 705/14.66 |

OTHER PUBLICATIONS

Written Opinion mailed Mar. 26, 2013, relating to International Patent Application No. PCT/US2012/058368 filed Oct. 1, 2012, 6 pages.
International Preliminary Report on Patentability mailed Apr. 1, 2014, relating to International Patent Application No. PCT/US2012/058368 filed Oct. 1, 2012, 7 pages.
Extended European Search Report completed May 12, 2015, in European Patent Application No. 12835580.7, 6 pages.

* cited by examiner

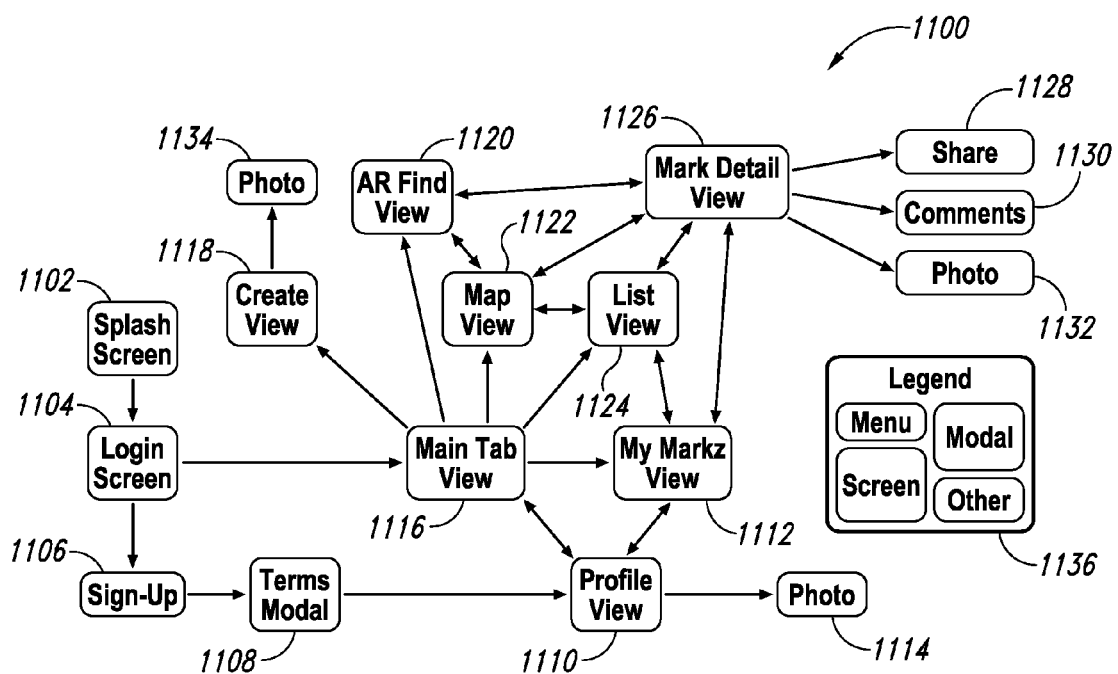
Fig. 11
Fig. 12A
Splash Screen
Sign/up Screen. First time user, or signed off are taken here.

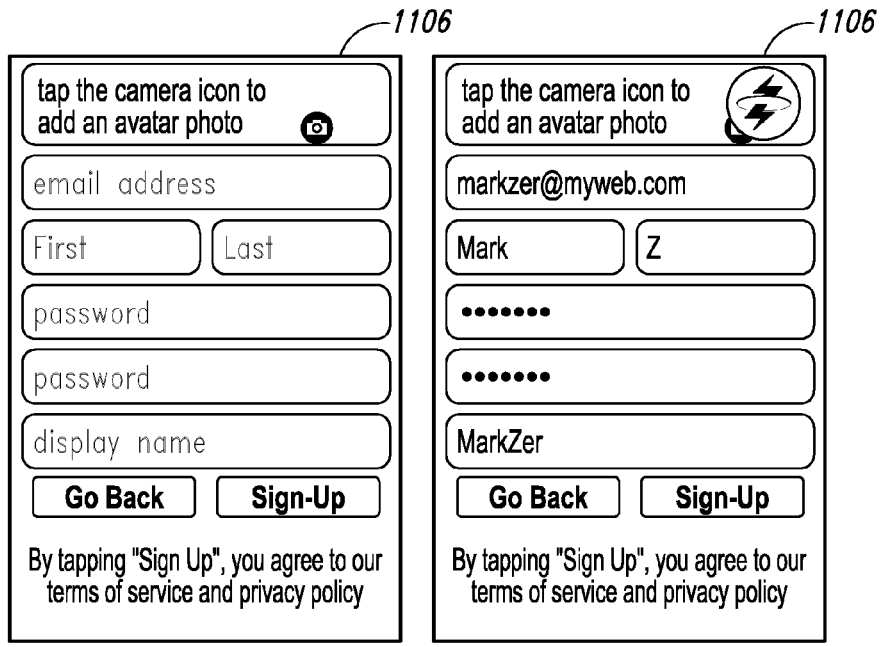
Blank Sign Up Page
Filled in Sign Up Screen (Note avatar photo is anything that you want to take a picture of.
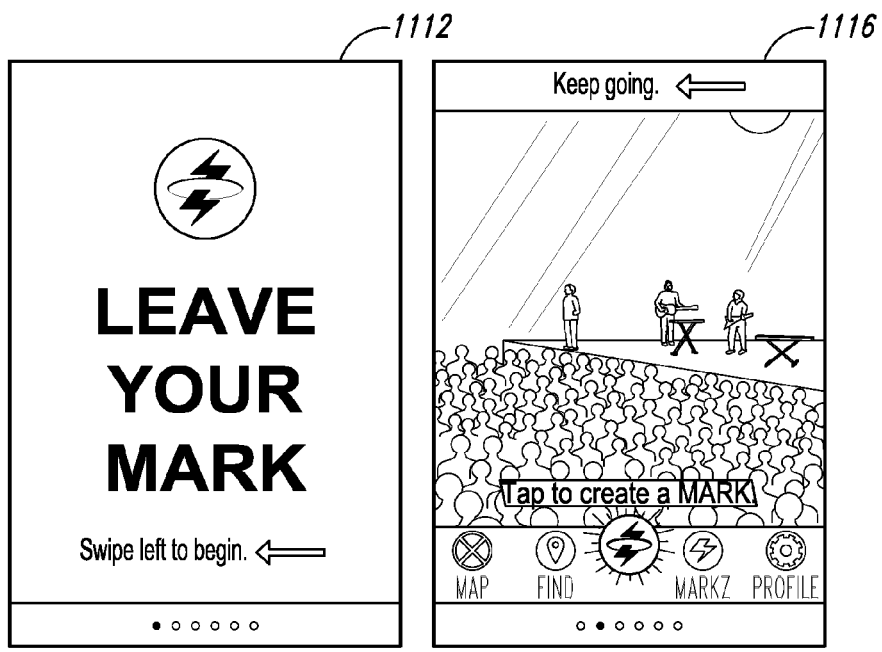
After Sign up, six intro screens follow
Fig. 12B

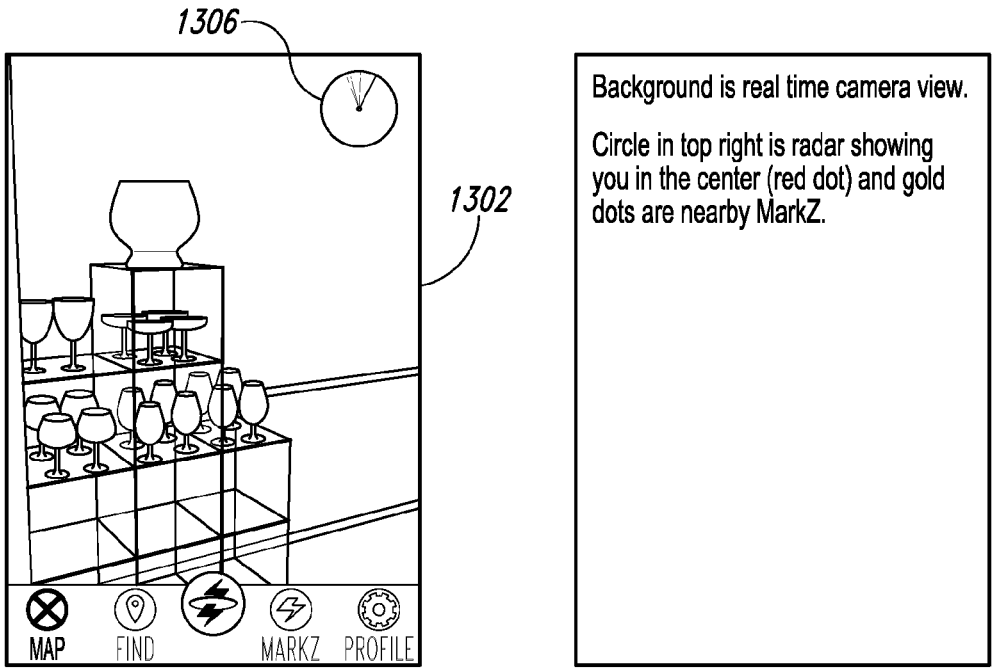
Main/Map view
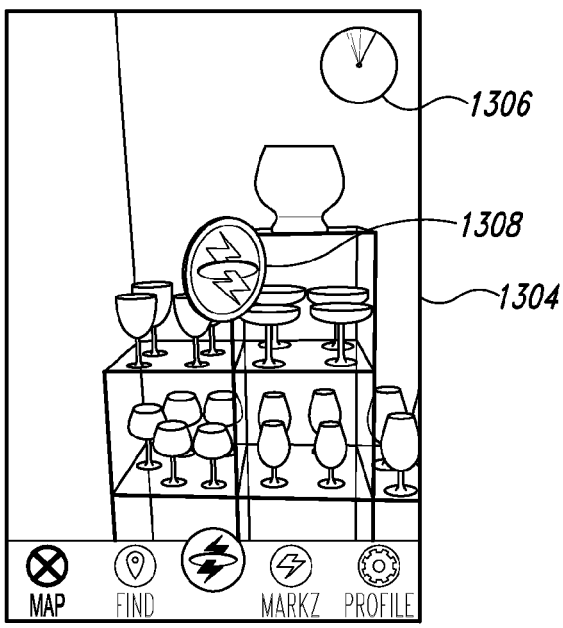
Main View with a MarkZ in the view finder
Fig. 13A

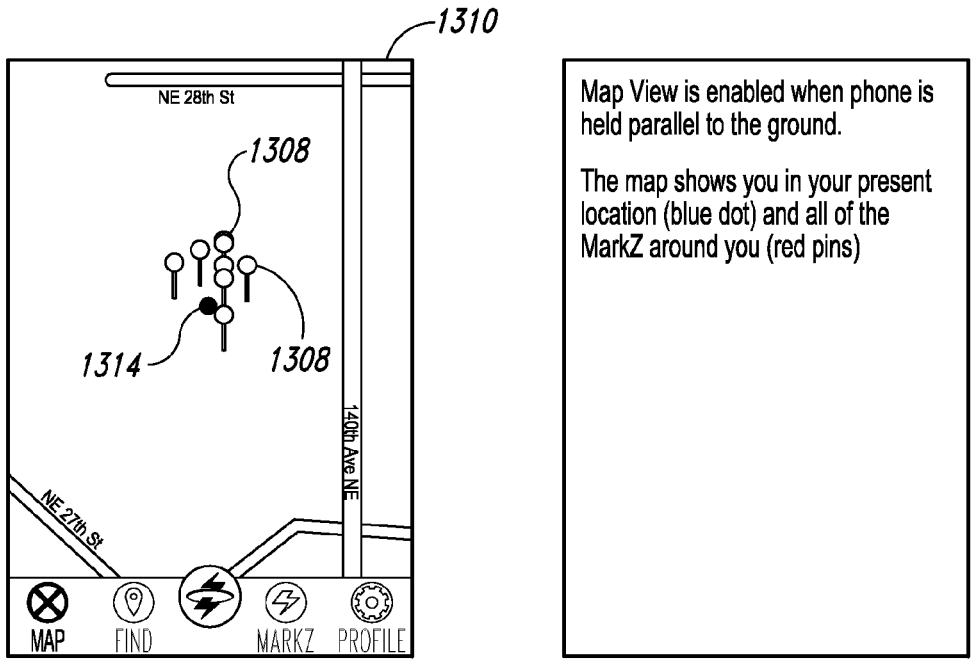
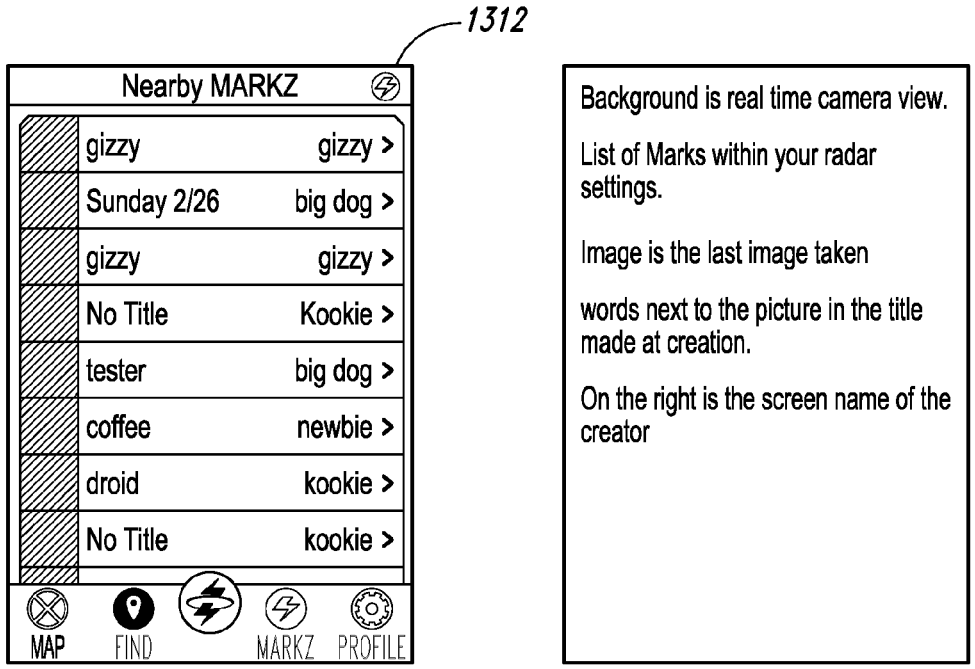
Fig. 13B

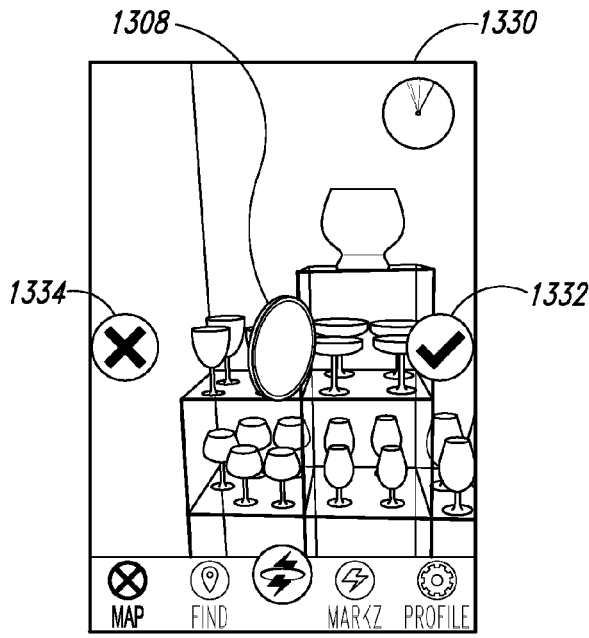

Create or Place the mark

Background is real time camera view.

You get to choose where in the real world that you want to "Make your MarkZ".

Green button places it where you see button it, Red cancels

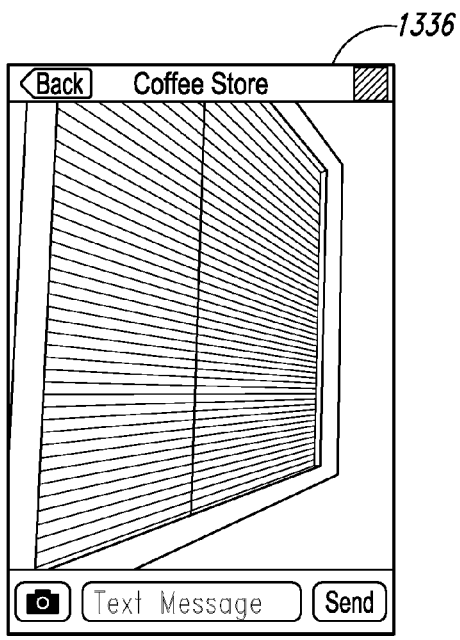

View Existing MarkZ

Background is real time camera view.

This is the view MarkZ Screen. You can get here by touching a floating Markz, or by selecting one from the Find or the My MarkZ screens.

Add New Picture by touching the camera icon at the bottom or add a text message by touching text message.

Fig. 13D

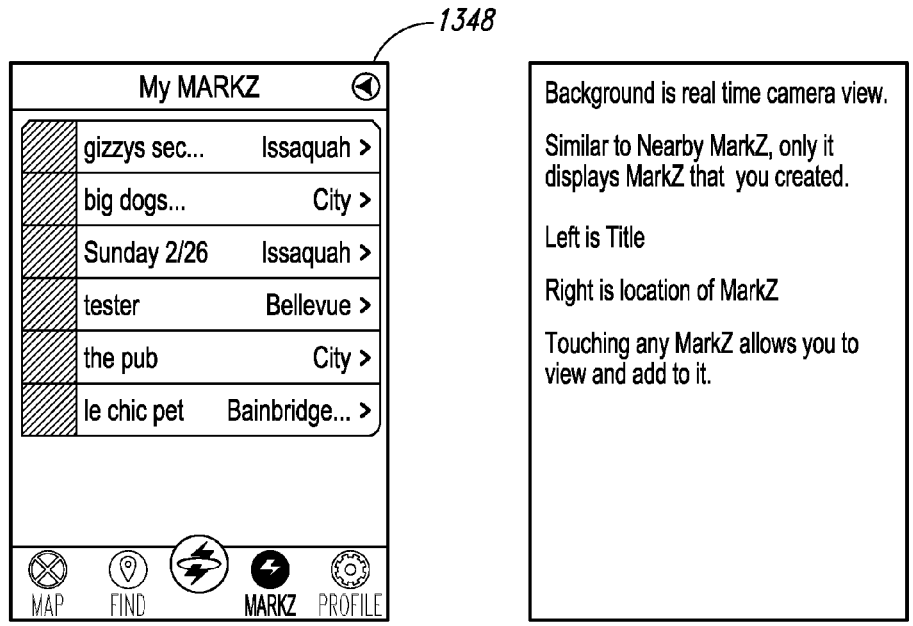
My MarkZ screen
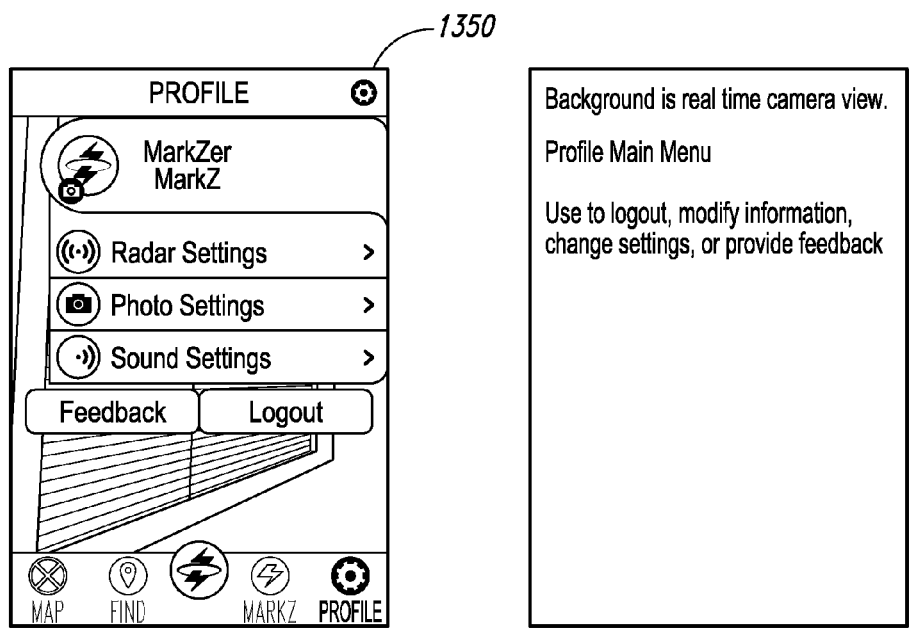
Profile Main Menu
Fig. 13F

Photo and sound settings (the background in all of these settings is the real time camera view, not the space needle).

LOCATION BASED AUGMENTED REALITY SYSTEM FOR EXCHANGE OF ITEMS BASED ON LOCATION SENSING METHODS AND DEVICES RELATED THERETO

CROSS-REFERENCE TO RELATED APPLICATIONS

The present application claims the benefit of U.S. Provisional Patent Application Ser. No. 61/541,908, filed Sep. 30, 2011, and of application PCT/US2012/058368, tiled Oct. 1, 2012, which applications are incorporated herein by reference in their entirety.

BACKGROUND

Known electronic interaction media include systems and methods such as hide-and-go-seek, "en.wikipedia.org/wiki/Hide-and-seek", tag, "en.wikipedia.org/wiki/Tag", and geocaching, "en.wikipedia.org/wiki/Geocaching." However, these systems have limited capabilities and modalities for interaction between the users.

Thus, there has gone unmet a need for improved systems and methods, etc., that provide for improved interactions between users such as, for example, the ability to transfer value items between one user and another and/or the ability to virtually, electronically mark a geolocation without any physical element being placed at the geolocation then creating a modality such that a different user can find that geolocation and open the mark and find something of value or interest therein.

The present systems and methods, etc., provide these and/or other advantages.

SUMMARY

The present application is directed in certain aspects to location-based augmented reality systems configured for exchange of items based on location sensing, and methods and devices related thereto. In one exemplary embodiment, a first, provider user identifies a specific physical location, for example by geolocation or imaging such as by taking a picture with a mobile smart phone or depositing a bar code tag, and enters the location into a first computing device, which can be the mobile phone or another computing device. The specific physical location can be any suitable location such as a specific set of longitude and latitude coordinates, a set of GPS coordinates, a store front identified by a photo of the store front, a park bench, etc. Thus, in some embodiments and aspects the present systems, methods, devices, etc., build on known systems and methods such as hide-and-go-seek, http://en.wikipedia.org/wiki/Hide-and-seek, tag, http://en.wikipedia.org/wiki/Tag_%28game%29, and geocaching, http://en.wikipedia.org/wiki/Geocaching.

In certain aspects, a value item is also associated with the specific physical location, for example a free cup of coffee at a nearby coffee shop. The existence of the tagging of the specific physical location is then transmitted to a second, recipient user. The value item can also be transmitted at this time, or can be kept as a secret from the second user until after the second user finds the specific physical location. The information transmitted to the second, recipient user can also include one or more of clues to the identity/location of the physical location, the actual specific physical location, or other information leading the second, recipient user to the specific physical location.

The second, recipient user is then tasked with finding the physical location. This can be very simple, such as going to the specific site already identified by the first, provider user, or can be a complex adventure or scavenger hunt with clue after clue leading the second, recipient user to the physical location. If desired, a "getting warmer" signal can also be associated with the physical location (or intermediate clues, if any) whereby a server or other computer provides a signal to the second, recipient user when the second user gets within a specific physical distance (e.g., within 100 feet, within 50 feet, within a city block, etc.).

When the second, recipient user finds the location, a "success signal" is then provided to the second user via a mobile data device associated with the second user, such as the second user's smart phone or PDA. In preferred embodiments, the success signal comprises a success icon such as a treasure chest that then requires further manipulation by the second user to be "opened", such as lifting the lid of the treasure chest. Further preferably, the success icon is a 3D image displayed on the mobile data device of the second user, for example the success icon can be a 3D image displayed as a superimposed element over the real world view in the application on the second user's mobile device.

Upon accessing the success signal, the second, recipient user is then awarded the value item and can use it such as by redeeming it at a vendor located at the physical location, or for purchasing physical goods in a variety of scenarios.

In some embodiments, the systems and applications herein can be used between friends or significant others for fun and friendship to "leave" fun things at one or more locations for the recipients. The systems and applications herein can also be used by commercial entities such as companies to provide incentives to customers or potential customers: come to store "X" or watch TV show "Y" and receive a value item such as a free hamburger by accessing the cool icon that will show up on the recipient's smart phone when a specific physical location is found or displayed to the smart phone. In such embodiments, the systems and applications herein can comprise traditional advertising, viral advertising, social network integrated marketing, customer-base building, etc., but implemented in new and significantly improved modalities.

The systems and applications herein can also be used to transfer information between users, or companies and users, based on specific requirements for user authentication and location. The intent behind these transfers may be as previously stated for e-commerce, marketing, discounts for physical good or services, and sharing secrets based on physical proximity and/or identity of or a group of users. It is simple to extend this idea to sharing information only when a group of users are in proximity to one another and in a specific geographic context or having recently completed a purchase at a physical store, or are proximate to one another or a physical location and are interacting in a specific way in a social networking context.

These and other aspects, features and embodiments are set forth within this application, including the following Detailed Description and attached drawings. Unless expressly stated otherwise, all embodiments, aspects, features, etc., can be mixed and matched, combined and permuted in any desired manner.

BRIEF DESCRIPTION OF THE DRAWINGS

FIG. 11 depicts an overview of an exemplary application map for location-based augmented reality systems, methods and/or devices, etc., herein including several exemplary options that can be included as features for users to use.

FIGS. 12A-C depict one example of a user experience using systems, methods and/or devices comprising augmented reality systems discussed herein.

FIGS. 13A-F depict a further example of a user experience using systems, methods and/or devices comprising augmented reality systems discussed herein.

DETAILED DESCRIPTION

Figure 1:
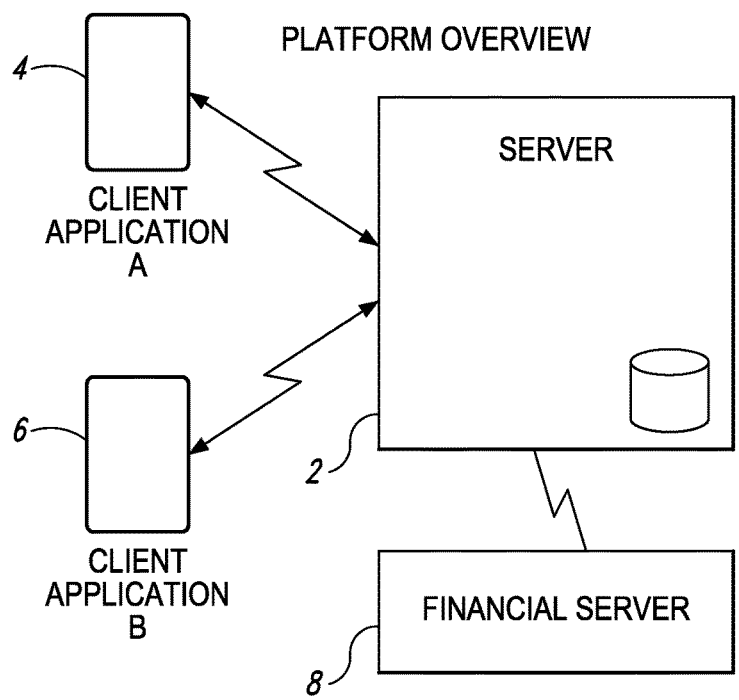
FIG. 1 depicts an overview of an exemplary whole platform or system for location-based augmented reality systems herein including a server and two or more mobile devices running client applications

In one aspect, the present systems and methods, etc., relate to platforms configured such that a first, provider user "leaves" a virtual value or item at a specific physical location by associating a virtual icon representing the virtual item with that specific location. The virtual item is then accessed at that location by a specific second, recipient user who finds and redeems or otherwise uses the virtual value for the second user's purposes. In certain embodiments, the second user must provide a unique identifier such as a PIN number or image to verify the identity or legitimacy of the second user.

The platform can be a mobile application retained within one or more mobile communication and computation devices such as cell phones, smart phones, personal digital assistants, tablets, laptop computers, etc. In some embodiments, the platform is configured such that the user can purchase, or otherwise obtain, and place an item of value (including for example money, goods, services, etc.) virtually in any geographic context. In other implementations the user may be required to be in proximity to one or more other users and/or in a specific geographic context to complete a transaction.

In yet another implementation, users may establish context by interacting in specific ways in a social network and adding that context to additional physical or proximity context. For example, users interacting via a social network such as Facebook® or Twitter® may add information and connections that help further pinpoint a location of a triggering icon and/or value item; such triggering icon and/or value item may be known by brand names such as ZAPTAG™ or MARKZ™. In one exemplary scenario: one or more recipient users use a treasure map to search for a value item. Such recipient users can work with each other and other friends as a tribe via the social network. The searching users can use the location-based augmented reality system herein and/or the social network(s) to identify, download and/or find value items. The system and networks can also be used cooperatively to check in and/or cooperate with other users (either provider or recipient users). For example, if a recipient user can't find the last item on a scavenger hunt list but is certain he/she/they are standing on the exact spot where he/she/they are supposed to be, the user can take a picture of the location and post it to the social network, or otherwise indicate their location such as by providing other identifying physical or proximity context. Another user on the social network can then reply with help, such as "You have to walk around to the other side of the fountain and look again."

The mobile application can comprise capture of a triggering icon such as an image of a physical location, a geotag of a specific location based on longitude, latitude, altitude, bearing, etc., and associating the triggering icon with the location. This triggering icon is then triggered when the second user(s) encounters the triggering icon, for example by holding his or her mobile phone within 20 feet/6 meters of the physical location or by capturing a location image of the physical location, which location image is then recognized by software associated with the platform to "trigger" the platform to indicate to the second user that he/she has found the desired location. Thus, when the second user finds the desired location, the triggering icon then triggers display of the virtual icon that specific location to the second user.

Another embodiment comprises use of the system herein where the triggering icon is first applied to/created from within a location or encoded message that is within a displayed/projected image such as within a TV or radio show: to access the location (i.e., the triggering icon), the second user must be watching or monitoring the TV or radio show when the location appears, which in turn downloads/creates the triggering icon within the second, recipient user's mobile device. The triggering icon is then used by the second, recipient user the same as otherwise stated herein.

The platform can be configured such that the virtual icon comprises a financial transaction such as a monetary exchange, delivery of a gift card, purchase of a cup of coffee at a nearby coffee shop by the second user, a ticket in a raffle, a reward for finding the triggering icon, a virtual product or other exchange of legal consideration. The platform can be configured such that for the financial transaction to be executed and/or settled, the second user must provide a unique identifier such as a PIN number, a fingerprint swipe or a self-image to verify the identity or legitimacy of the second user to receive the virtual icon and financial benefit.

In certain embodiments, the platform, such as the mobile application, is configured such the second recipient user receives, at the behest of the first, provider user, a notice of the valued item and/or and its location when the first user tags the location, when the first user determines and/or identifies the value item, and/or when the first user actively causes the notice to be sent.

In some embodiments, the mobile application is configured to assist the recipient user to locate the valued item with proximity feedback such as a "getting warmer" signal or the provision of additional information as to the identity of the specific location.

The mobile application can be configured to recognize any desirable icon, token, or geological location and can display an augmented reality object and interact with the user prior to awarding the value item, including for example accepting a code, image or password before revealing the value item and/or transferring the valued item to user.

The mobile application can also be configured for redemption of the valued item.

The augmented reality platform can also be configured for the purchase of virtual items that can be placed and viewed virtually in a geographical location.

DESCRIPTION OF THE FLOW DIAGRAMS SHOWING EXEMPLARY EMBODIMENTS

Generally, the flow diagrams included herewith depict one or more users with mobile computing devices, such as smart phones, accessing information based on a geographic context and their proximity to one another and/or a specific geographic point. In some diagrams they are using their established context to conduct a financial transaction or exchange other legal consideration.

Platform Overview

FIG. 1 provides an overview of an exemplary whole platform or system herein including a server 2 and two or more mobile devices 4, 6 running client applications A and B, which can be the same or different applications or different functionalities within the same application, and can include, for example computer software or hardware containing the methods, etc., on a non-transitory computer readable medium. Other computer configurations are also possible to convey the underlying methods and systems herein.

The server platform can be a network server that stores all positioned tokens such as triggering icons, value items, success icons, etc., and conducts the financial transactions with one or more financial servers 8. The server platform can also be any other suitable computer configuration such as a cloud computer system or a dedicated server or central computer.

Place and Redeem System

Figure 2:
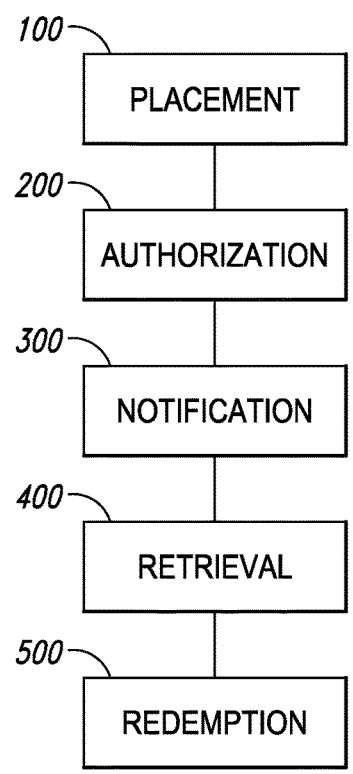
FIG. 2 depicts an overview showing exemplary steps for a first, provider person or entity to successfully leave a virtual token with a financial or other value in a specific location, pay for that value, and notify one or more second, recipient users of the token.

FIG. 2 provides an overview showing the steps for a first, provider person or entity to successfully leave a virtual token with a financial or other value in a specific location, pay for that value, and notify one or more second, recipient users such as people or entities. This shows how the one or more second users can locate, retrieve, and redeem the tokens. Such methods can include 100 placement of the virtual token/triggering icon; 200 authorization for at least one second, recipient user to access the virtual token; 300 notification of the second, recipient user of the existence and/or location of the virtual token; 400 retrieval by the second, recipient user of the virtual token; and, 500 redemption by the second, recipient user of the virtual token.

Placement

Figures 3, 4:
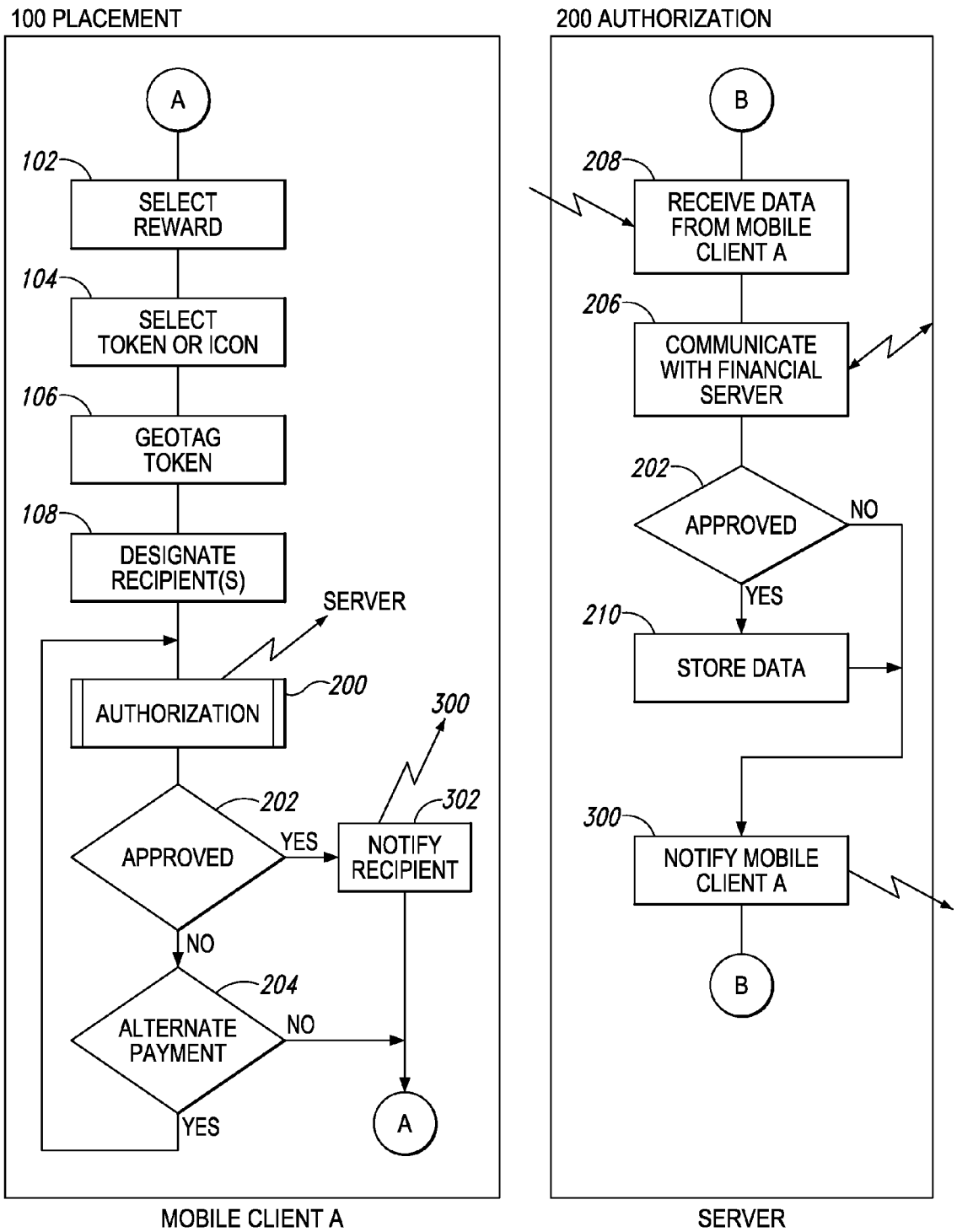
FIG. 3 depicts illustrates exemplary steps a first, provider user executes to leave a virtual value item for one or more second, recipient users.
FIG. 4 depicts an example of how, during the placement of a virtual reward, the client application can communicate with the platform server.

FIG. 3 illustrates exemplary steps a first, provider user executes to leave a virtual value item for someone else. The item may or may not be related to where it is left (e.g., it could be a logo for a provider entity's store, or it could be a purely fanciful icon chosen for artistic or esoteric reasons). The first user could, for example, leave a cup of coffee at a coffee shop for a friend and pre-pay for it with their cell phone account, a credit card, a gift card, or other financial methods.

Thus, in exemplary FIG. 3, the steps for placement of a placement of the virtual token/triggering icon 100 can include selecting a reward or other virtual value item 102, selecting a token or icon to represent the virtual value item 104; selecting a target token such as a geotag token 106 and designating at least one recipient (second user(s)) 108.

The first, provider user then obtains authorization for the transaction, which can include authorization for at least one second, recipient user to access the virtual token 200. The transaction is then approved 202 (or not). If not, alternate payment 204 can then be provided. Once the transaction in 200 is authorized, the second, recipient user is notified of the existence and/or location of the virtual token in 300.

The first user can also indicate if the token or value item is passcode protected, mobile device specific, of available to anyone who finds it. Additional choices can include how difficult the value item is to find. The token can be a real item or merely a geographic location.

The user can also select how the augmented reality token will appear to the second, recipient user(s).

Once the location and value item are identified/created, the recipient can be notified via the receiving application, sms messaging, email, or phone call, etc. Once payment and/or retrieval is executed, the provider can likewise be notified via the receiving application, SMS messaging, email, or phone call, etc.

Authorization

FIG. 4 illustrates how, during the placement of a virtual reward, the client application can communicate with the platform server, which gets the financial authorization 200 to complete the transaction, and records all desired virtual reward information in a database for later retrieval.

Thus, in FIG. 4, authorization step 200 comprises receiving data from the first, provider user 208, communicating with a financial server to authorize the transaction 206, approving the transaction 202, storing data 210 and notifying the second, recipient user of the existence and/or location of the virtual token 300.

Retrieval

Figures 5, 6:
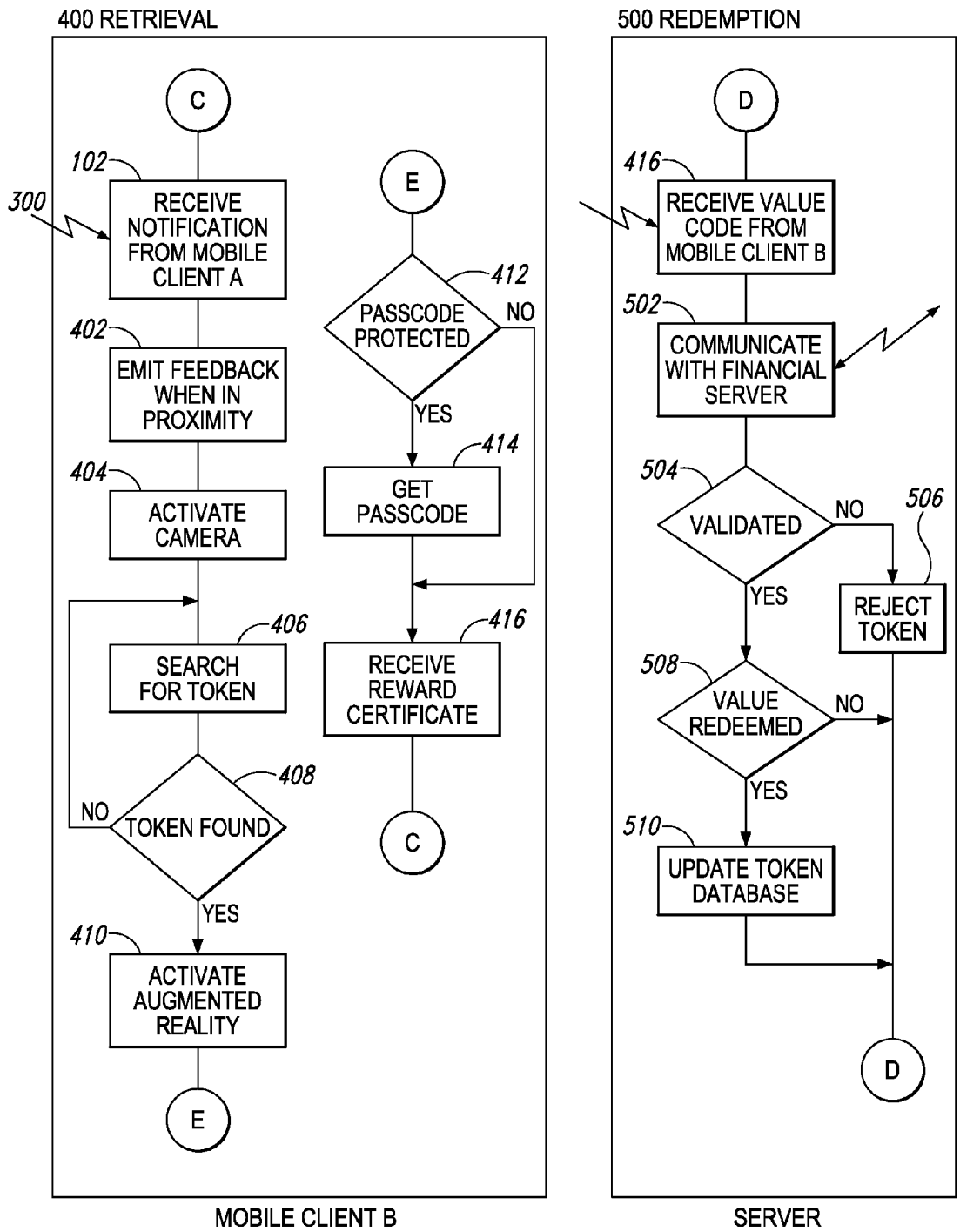
FIG. 5 depicts an example of how the recipient is given an approximate location for a reward and, once the recipient is in the desired range, the client application on the recipient's mobile device beginning to deliver haptic feedback or other "getting warmer" information.
FIG. 6 depicts an example of how the recipient's mobile device will store data representative of the reward they have retrieved.

FIG. 5 illustrates how the recipient is given an approximate location for a reward and once the recipient is in the desired range, the client application on the recipient's mobile device will begin to deliver haptic feedback or other "getting warmer" information. At that time, the camera is activated on the recipient's mobile device and once the token is discovered, the token (success icon) will appear as an augmented reality object in the recipient's phone.

Thus, in exemplary FIG. 5, retrieval step 400 begins with notification step 300 of the triggering icon comprising the computing device emitting feedback 402 to the user to inform the second, recipient user of the virtual token/triggering icon that designates the geolocation or other desired target point. The camera or other scanning device of the computing device is activated 404, the virtual token is searched for 406 and found 408 (the searching can be repeated several or even many times until the virtual token is found). Once the virtual token is found, the augmented reality of the systems, etc., herein is activated or triggered 410 so that the prize token or other value item(s) can be transmitted to the second, recipient user.

If desired, all or part of the processes discussed herein can be protected, as also shown in FIG. 5. For Example, the process can be passcode protected 412. The user then obtains the passcode 414 to prove eligibility to access the process, then upon using the passcode the virtual value item such as a reward certificate is received 416.

Thus, once found, the recipient can execute whatever validation process is required or desired, and receive their reward.

Redemption

FIG. 6 illustrates how the recipient's mobile device will store data representative of the reward they have retrieved. This data can be transmitted visually, electronically, or otherwise to a retailer who can contact the server to validate and execute the reward. Further, the value items may be associated with and stored in the second, recipient user's account on the server or cached locally on the mobile computing device that the second, recipient user is using to find the item.

Thus, in exemplary FIG. 6, redemption step 500 begins with receiving a value code or reward certificate 416, the communicating with the financial server 502. The reward request is then validated 504. If accepted, then the value item is redeemed 508 and if desired the token database is updated 510 so that the value item cannot be redeemed again. If the request for the value item is declined then the request is rejected 506 and the transaction ceases and/or is returned to a prior point (for example, re-entry of the passcode to reduce the possibility of an inadvertent data entry error. Note, the steps shown in FIGS. 2-6 and in other Figures herein do not need to be performed in exactly the order shown; variations in order and sequence can be implemented as desired and appropriate.

In other embodiments and aspects, the tag-placement-find system herein could also be used to place items for sale, instead of placing pre-paid items. For example, many items could be placed on a virtual shelf for anyone with the client application to discover. In this embodiment, the mobile client B can be used to purchase the items electronically similar to the fashion that the items were purchased by mobile client A in other embodiments. Delivery can be instant in the retail location, instant at a different retail location, or fulfilled by mail or delivery service or otherwise as desired.

In a similar manner, coupons for discounts can be left for anyone to discover and retrieved without any money changing hands until the coupons are redeemed.

Exemplary Embodiments

FIGS. 7A-7D depict one example comprising a series of screen shots of the augmented reality systems as discussed herein configured for exchange of items based on location sensing.

1. Launch App—A Grid Appears Over the View of the "Real World" (Physical Location) Through Display on the First, Provider User Mobile Device.

Figure 7A:
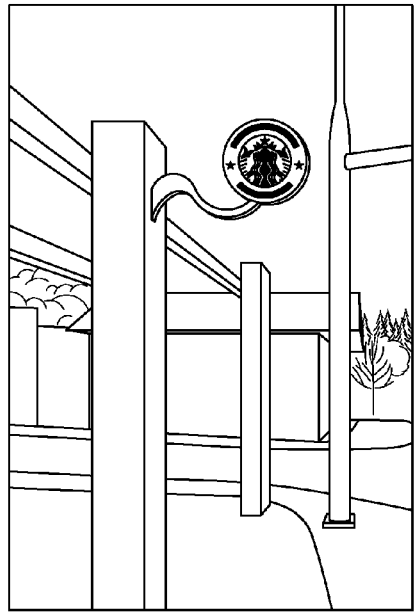
FIGS. 7A-7D depict one example of systems, methods and/or devices, etc., for implementing augmented reality systems as discussed herein configured for exchange of items based on location sensing.

FIG. 7A depicts an example of what is seen on the screen of a provider mobile device or other suitable first, provider user device: The grid informs the user that he/she is in the augmented reality app herein and that he/she is ready to place a triggering icon in the environment/specific physical location, i.e., the view that is seen through the display of the device.

2. Targeting Mode.

Figure 7B:
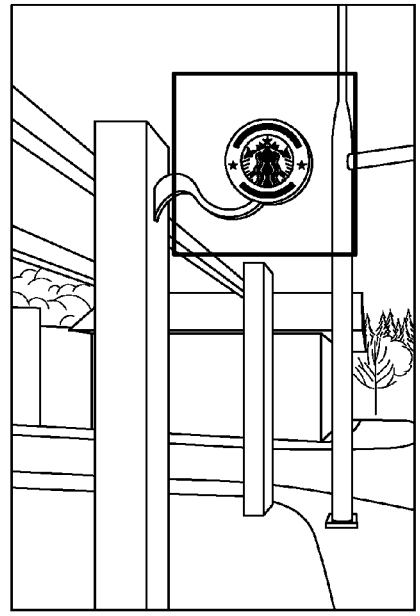

FIG. 7B depicts an example of a target element, which is the green square in the Figure that appears within the grid lines. This target element frames the area where the first, provider user wants to place an item (the virtual token/triggering icon). In this case, the triggering icon is a Starbucks® coin, which icon can be already residing within the app on the provider device or can be downloaded or otherwise obtained for use by the first, provider user. The targeting element can be configured to expand or contract on the screen with the touch of the user's finger(s). In one embodiment, a geometric ripple effect or other indicator animates from the center of where the user touched. Such target-touch indicator indicates at least: 1) the touch was effective, 2) the center location of the touch, and 3) the margin of proximity notification, which means the outside of the ripple shows the first, provider user the outside edge of "the zone" that surrounds the icon which will trigger the triggering icon to appear on the second, recipient user's device.

3. Tagged Mode.

Figure 7C:
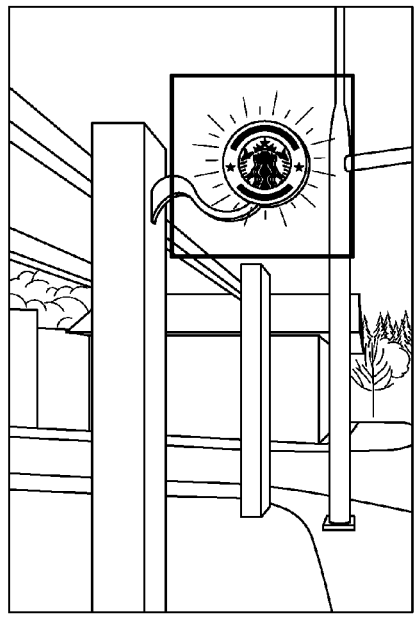

FIG. 7C depicts an example of a tagged mode. Once a "tagging" is effective, a tag-success indicator is displayed. In FIG. 7C, the triggering icon is highlighted to indicate that the triggering icon has been placed. To effect such tagging, for example, the first, provider user touches and presses a designated key or symbol or other element for three (3) seconds. The software of the current systems, then "snaps" the triggering logo into the place(s) where the first, provider user's finger was.

4. Discovering and Zapping.

Figure 7D:
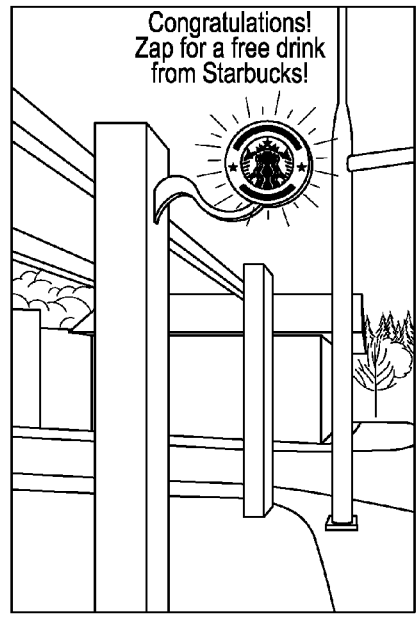

FIG. 7D depicts an exemplary result shown on the second, recipient user(s) user interface (UI) when the recipient user looks around and finds the triggering icon. The triggering icon is highlighted and floats above the target spot at the specific physical location previously identified. The second, recipient user can do a variety of things in response to such "discovery" of the specific physical location/triggering icon, including for example: 1) If the icon has content inside: opening the container (triggering icon), typically with a single click, and displaying the contents, which contents may be, e.g., icons for pictures, movies, messages, etc.; 2) If the triggering icon itself is the actual content, for example a free drink, then activating the triggering icon, for example by double clicking, then "dropping" the coin into the second, recipient user's "pocket" (i.e., downloading it into the second, recipient user's mobile device such as a smart phone).

5. Organizing the Elements of the Systems, Etc., Herein on the User's Mobile Devices.

Figure 8:
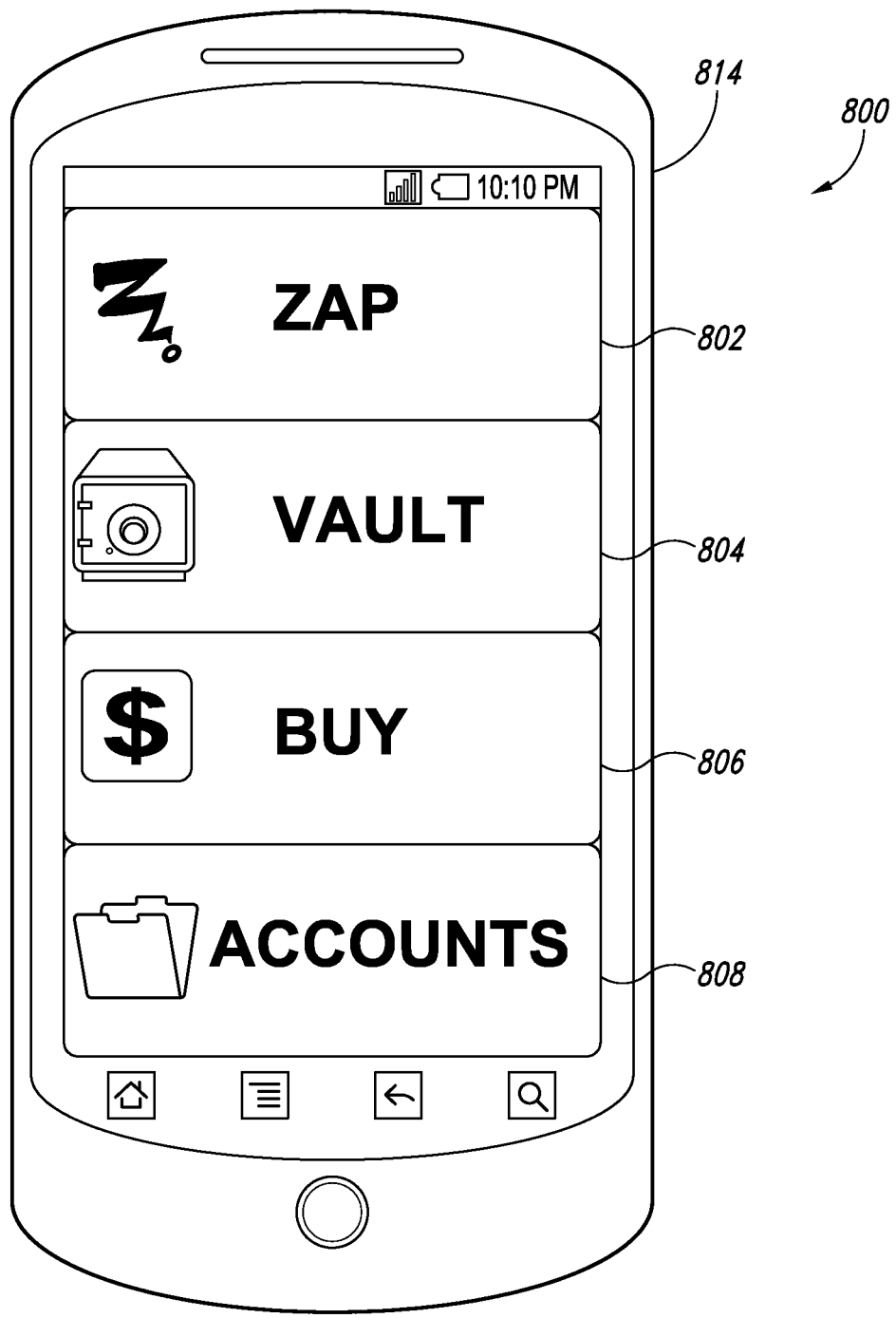
FIG. 8 depicts examples of how certain elements (e.g., triggering icons, specific physical locations, rewards for successfully finding a triggering icon, etc.) can be organized on mobile devices or other suitable computer elements of the first, provider user(s) or the second, recipient user(s).

FIG. 8 depicts an example of how the elements (e.g., triggering icons, specific physical locations, rewards for successfully finding a triggering icon, etc.) can be organized on either or both the mobile devices or other suitable computer elements 814 of the first, provider user(s) or the second, recipient user(s). For example, simple, highly identifiable categories can be provided in a home menu 800 which hold the elements of the systems herein, for example: An application identification icon, here "ZAP", 802, Vault 804, Buy 806 and Accounts 808. Such categories or folders can also have special PINs or other security devices that assure that only the desired user can access the information and content within the category/folder.

Figure 9:
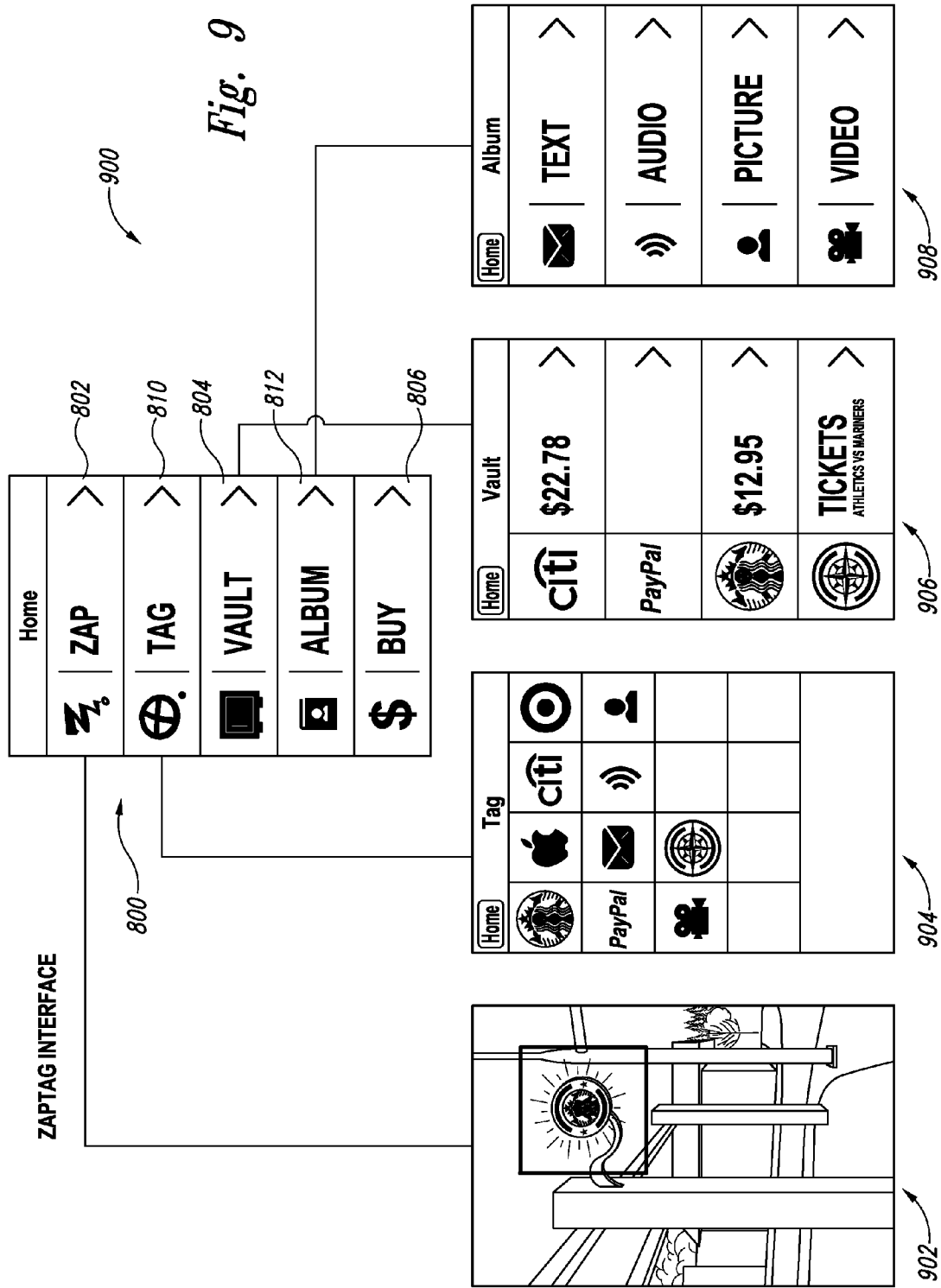
FIG. 9 depicts another example of organization for the systems, methods, etc., herein.

FIG. 9 depicts another example of organization 900 for the systems, methods, etc., herein. In this example, home menu 800 comprises application identification icon (ZAP) 802, vault 804, tag 810, album 812 and buy 806. Clicking on the respective application identification icon (ZAP) 802, vault 804, tag 810, album 812 "buttons" then brings up the corresponding sub-systems shown as the application identification icon screen shot (ZAP) 902, the vault screen shot 904, the tag screen shot 906, and the album screen shot 908.

When the 'Tag' menu of triggering icons is accessed, the desired icon (2D or 3D or otherwise) is selected by touching and holding the icon for a specified time such as 2, 3 or 4 seconds. The surrounding user interface then fades and the view on the display becomes a view of the specific physical location as captured by the camera of the mobile device. The tag screen then places the triggering icon (typically 3D) as though it were floating in place at the desired specific physical location for the recipient user to discover. For example, as shown below, the floating triggering icon "sits" over the store front signage even as the phone may be moved, giving the appearance that the triggering icon is "rooted" in place on the exact spot of the specific physical location.

Figure 10:
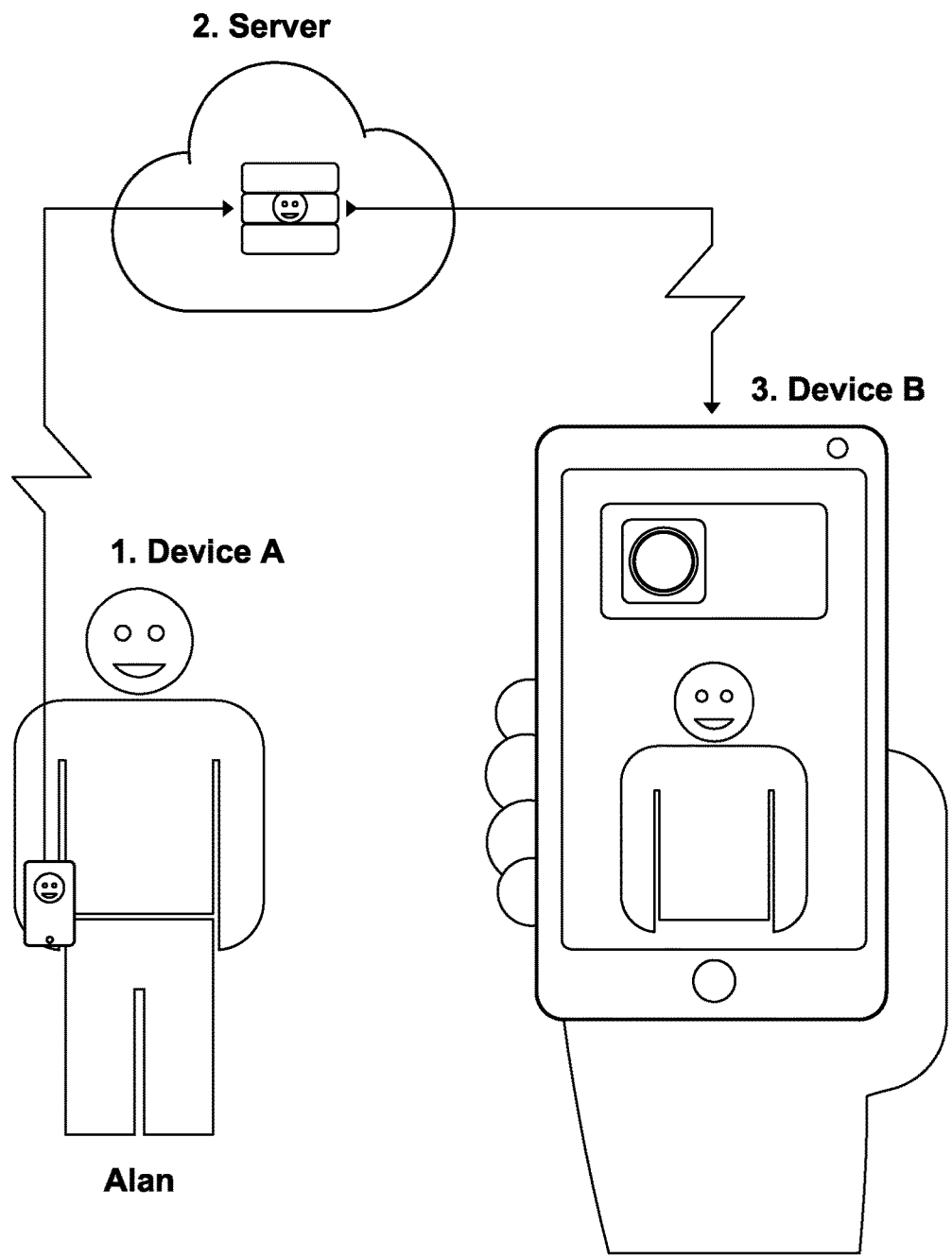
FIG. 10 depicts an alternate overview of an exemplary platform or system for location-based augmented reality systems, methods and/or devices, etc., herein including a server and two or more mobile devices running client applications.

FIG. 10 depicts an alternate overview of an exemplary platform or system for location-based augmented reality systems, methods and/or devices, etc., herein including a server 1002, a first, provider user 1004 and a second, recipient user 1006 running client applications.

FIG. 11 depicts an exemplary application map 1100 for location-based augmented reality systems, methods and/or devices, etc., herein. The map 1100 includes several exemplary options that can be included as features for users to use.

Briefly, a user enters the system shown in application map 1100 at splash screen 1102 then accesses login screen or button 1104. If the user is new, the user accesses sign-up screen or button 1106, proceeds through a terms modal 1108 then goes on to a profile view screen 1110 where the new user inputs his/her name and other desired or required identifying information such as a user photo 1114. Once determined to be eligible, the new user goes to the main tab view 1116 or to a main application screen 1112, identified in FIG. 11 as "My MARKZ™ View" 1112. If already an eligible user, the user proceeds from the login screen or button 1104 to the main tab view 1116. The user, whether new or already registered, then goes to other screens/functions. These screens or functions can include: a) a main application screen 1112 that comprises access to multiple functions provided by the application discussed herein; b) a create view screen 1118, which can create a view of a target or other view then takes a photo of it 1134; c) an alternate find view screen 1120 that provides the ability to create an alternate target view such as of a television show; d) a map view screen 1122 that maps the view of the target into the application (the screen can also itself, or through appropriate linking button(s) display a map leading to the target location and/or a map of the functions of the application); d) a list view screen 1124 that lists target marks, i.e., triggering icons and/or value items that are either available to use, that have been used, and/or that have been received from another user into the current user's smart phone; or, e) a mark detail view screen 1126 that provides details of the marks/triggering icons and/or the value items are either available to use, that have been used, and/or that have been received from another user into the current user's smart phone.

The mark detail view screen 1126, or other access point as desired, provides share functions 1128, comments areas 1130 and more photo functions 1132. The application map can also comprise a map legend 1136 or other application navigation device.

Figure 12C:
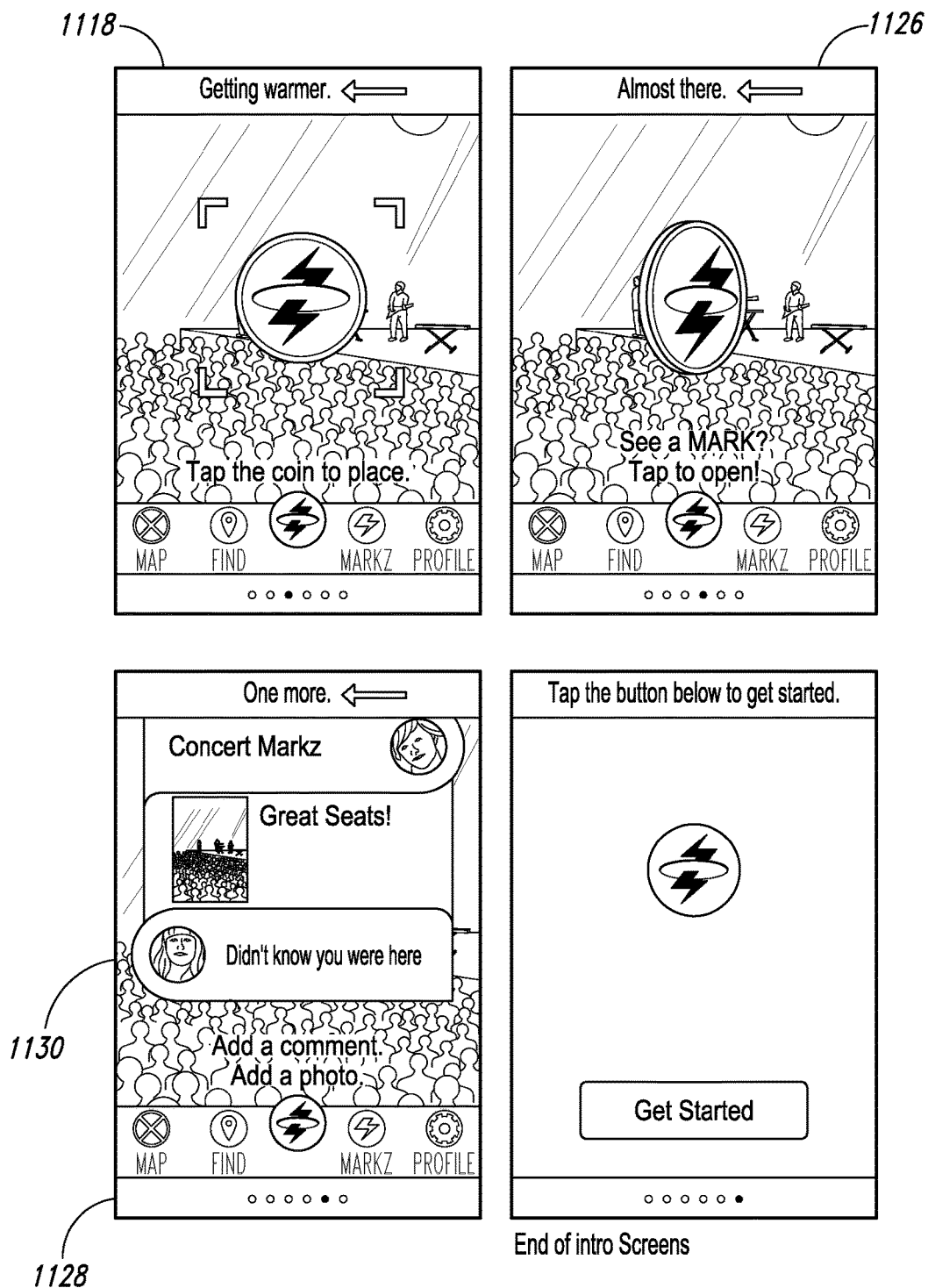

FIGS. 12A-C depict one example of a user experience using systems, methods and/or devices comprising augmented reality systems discussed herein, and particularly those included in the application map 1100.

In particular, FIG. 12A shows splash screen 1102 and login screen or button 1104.

FIG. 12B shows in the upper two panels sign-up screens 1106. The left sign-up screen is blank and the right sign-up screen is filled-in. The sign-up screen is then followed by a tutorial that begins in the lower left screen a main application screen 1112 then main tab view screen 1116, which screen can be used to initiate the process of identifying a target and placing/associating a triggering icon on/with the target.

FIG. 12C continues the tutorial process and shows in the upper left panel a create view screen 1118 that shows the target and takes a target photo. FIG. 12C also shows in the upper right panel a mark detail view screen 1126, which as shown provides details of the marks/triggering icons and/or the value items that are being placed and/or have been received from another and are therefore appearing above the target and ready for redemption. FIG. 12C then shows, in the lower left screen, comments between a first user and a second user upon tapping the triggering icon. The lower right screen then shows an end to the introductory tutorial screens, FIGS. 13A-F depict a further example of a user experience using systems, methods and/or devices comprising augmented reality systems discussed herein. In particular, FIGS. 13A-F depict a series of screen shots that can be seen by a user in the process of using the applications, i.e., the methods, systems, etc., discussed herein.

In FIG. 13A, the upper screen 1302 shows the view on a user's smart phone of a potential target site. The lower screen 1304 shows the view with a triggering icon (MARKZ™) 1308 shown on the screen.

The screens 1302, 1304 also show a "radar" 1306 showing the user as a red dot in the center of the specific geographic area as well as pre-existing triggering icons (MARKZ™)

In FIG. 13B, the upper screen 1310 shows a map view on a user's smart phone of a user 1314 and of nearby triggering icons 1308. This screen is comparable to one functionality of map view screen 1122 in FIG. 11. The lower screen 1312 shows a pop up listing the nearby triggering icons with additional information, comparable to mark detail view screen 1126 in FIG. 11.

Figure 13C:
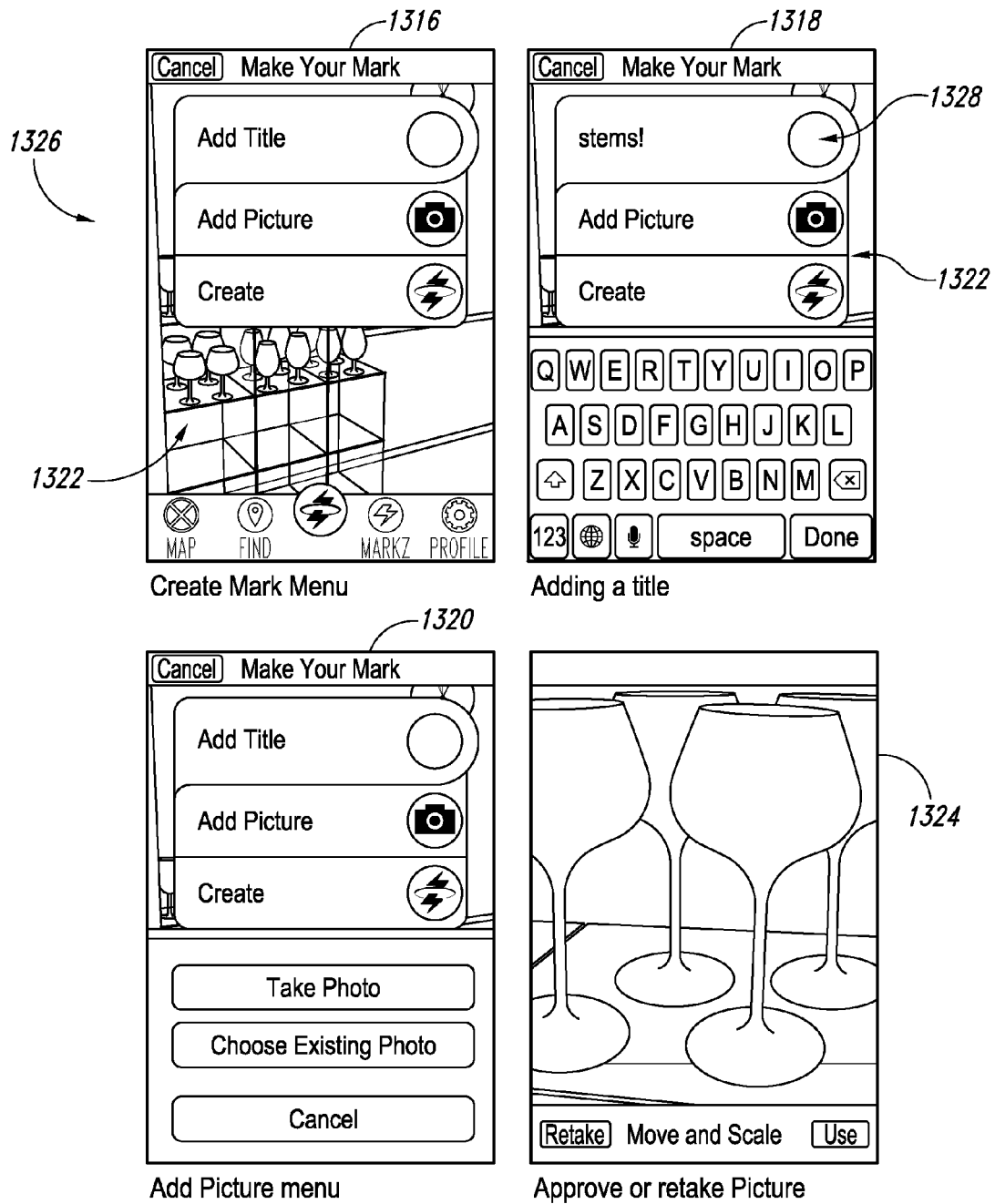

FIG. 13C shows initial steps in creating and placing a triggering icon at a target site. Upper left screen 1316 shows a target site 1322 with target-marking buttons 1326 superimposed thereon. Upper right screen 1318 shows the target site 1322 with a target name 1328 input into the top-most target-marking button 1326. Lower left screen 1320 shows a take-photo menu superimposed over the target site 1322. Lower right screen 1324 shows a proposed photo of target site 1322 for approval or retake.

FIG. 13D upper screen 1330 shows a further step in creating a triggering icon 1308 at a target site 1322. The upper left screen 1330 shows the triggering icon 1308 superimposed on the target, as well as accept button 1332 and reject button 1334 for the user to accept or reject the final placement of the triggering icon 1308.

FIG. 13D upper screen 1330 shows a further step in creating a triggering icon 1308 at a target site 1322. The upper left screen 1330 shows the triggering icon 1308 superimposed on the target, as well as accept button 1332 and reject button 1334 for the user to accept or reject the final placement of the triggering icon 1308.

FIG. 13D lower screen 1336 shows a next aspect of the application herein. Namely, FIG. 13D lower screen 1336 shows a smart phone view screen showing a view at a coffee store, as a precursor to the user using the application here to find pre-existing triggering icon from other user(s) (i.e., the smart phone user is the second, recipient user while the other user(s) are first, provider user(s)).

Figure 13E:
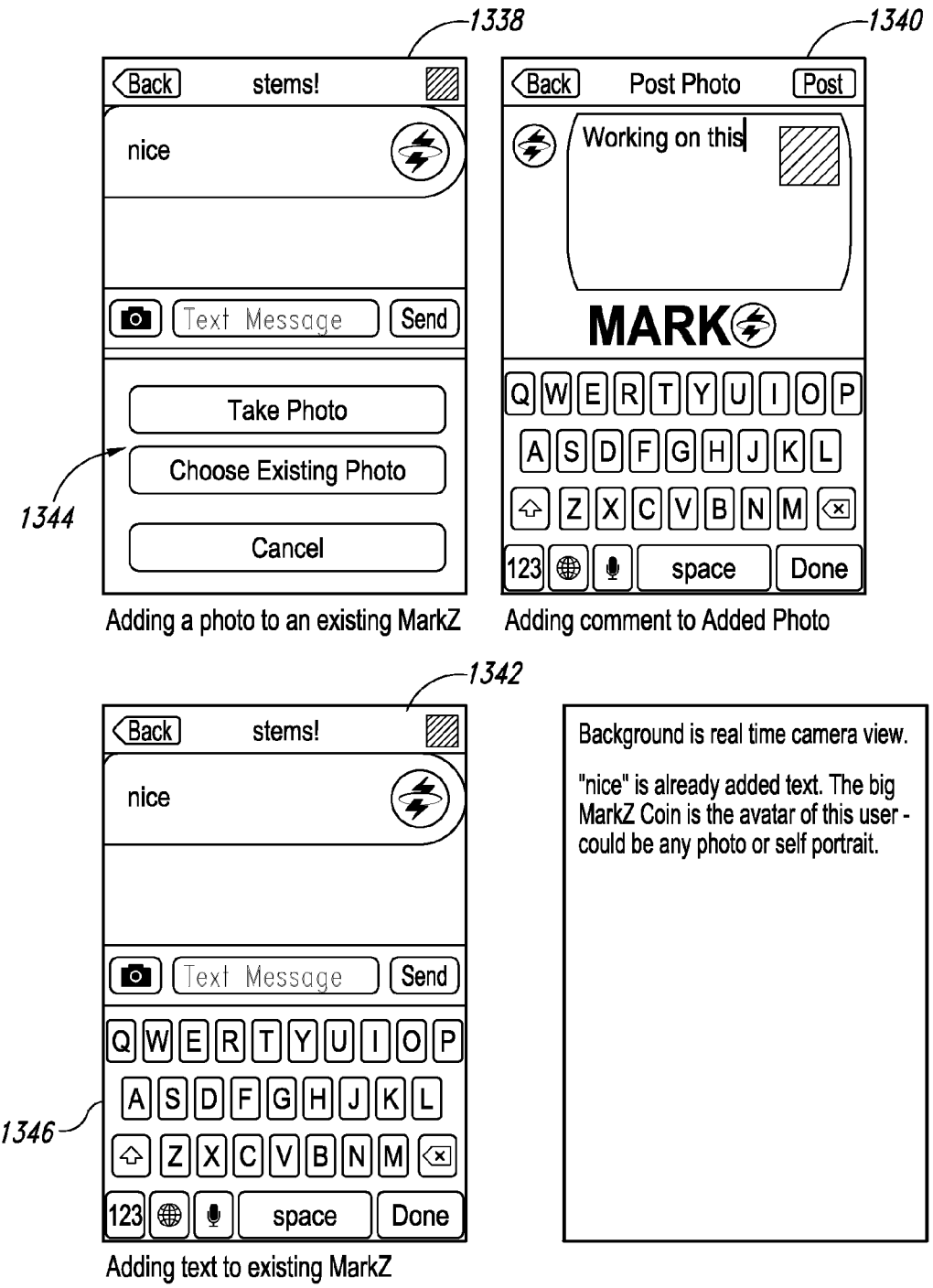

In FIG. 13E, upper left screen 1338 shows the ability of a user to take a photo or choose an existing photo to add to the triggering icon, via a pop-up menu 1344. Upper right screen 1340 shows the ability of a user to add text to the triggering icon, via a pop-up keyboard 1346, while lower left screen 1342 shows such text ("nice" added to the triggering icon.

In FIG. 13F, upper screen 1348 shows a main triggering icon menu, analogous to main application screen 1112 in FIG. 11. In this embodiment, the screen shows details about both triggering icons placed by the smart phone's user as well as triggering icons placed by others users.

In FIG. 13F, lower screen 1350 shows a sample of a profile screen analogous to profile view screen 1110.

Figure 14:
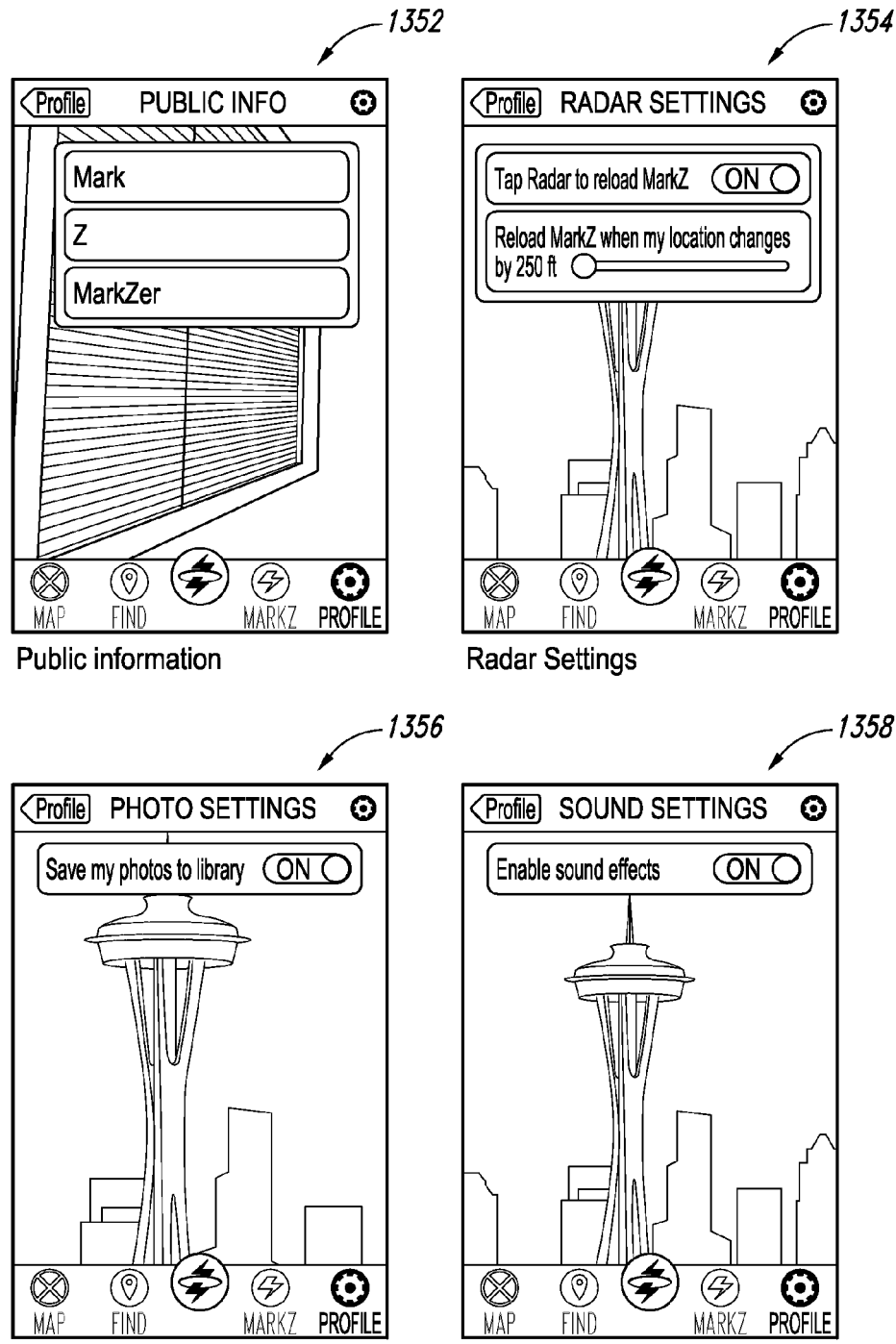
FIG. 14 depicts various features that can be provided to users by the systems, methods and/or devices comprising augmented reality systems discussed herein.

FIG. 14 depicts various features that can be provided to users via the profile view screen 1110. The background view would likely vary as the phone is moved around.

FIG. 14 upper left screen 1352 shows a sample of a profile screen comprising a drop-down menu wherein the user can determine what information relating to the triggering icon and/or other aspects of the application are publicly available.

FIG. 14 upper right screen 1354 shows a sample of a profile screen comprising a drop-down menu wherein the user can determine the parameters of the radar that shows, for example, the location of nearby triggering icons.

FIG. 14 lower left screen 1356 shows a sample of a profile screen comprising a button wherein the user can save or otherwise manage photos taken pursuant to use of the application herein.

FIG. 14 lower right screen 1358 shows a sample of a profile screen comprising a button wherein the user can manage sounds settings relevant to the application herein.

Figures 15, 16:
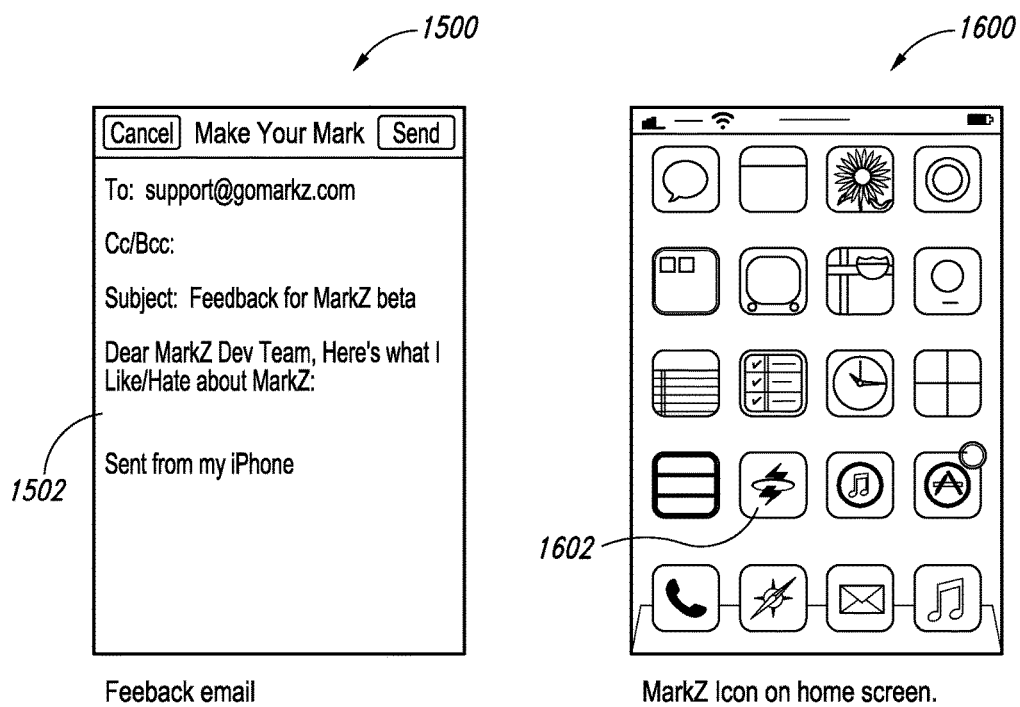
FIG. 15 depicts an example of a feedback utility for the location-based augmented reality systems, methods and/or devices, etc., herein.
FIG. 16 depicts an example of a home screen including a quick access icon for the location-based augmented reality systems, methods and/or devices, etc., herein.

FIG. 15 depicts an example of a feedback utility for the location-based augmented reality systems, methods and/or devices, etc., herein. The feedback screen 1500 includes an email entry screen 1502.

FIG. 16 depicts an example of a home screen 1600 including a quick access icon 1602 for the location-based augmented reality systems, methods and/or devices, etc., herein.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A system for electronically transferring at least one value item from a first user to a second user via an augmented reality system, comprising:
a first, provider user computing device configured to identify a specific physical location and associate a triggering icon representing a value item with the specific physical location; and,
the second, recipient user mobile computing device, wherein the second, recipient user mobile computing device is configured to:
receive an indication of the existence of the value item and/or the specific physical location;
detect via a sensor on the second, recipient user mobile computing device that the second, recipient user mobile computing device is in a designated range of the specific physical location;
responsive to the detection, display the triggering icon on the second, recipient user mobile computing device using augmented reality such that a display of a portion of a real world location is augmented with a display of the triggering icon;
wherein the system is configured such that upon receiving notification that the triggering icon has been triggered by the second, recipient user mobile computing device, the second recipient user receives the value item.

2. The system of claim 1 wherein the specific physical location is identified by geolocation or an image of the physical location.

3. The system of claim 1 wherein the first, provider user computing device is a mobile smart phone and the specific physical location is identified by causing the mobile smart phone to be located at the specific physical location.

4. The system of claim 1 wherein the specific physical location is identified by depositing a bar code tag to the specific physical location.

5. The system of claim 1 wherein the specific physical location is at least one of a specific set of longitude and latitude coordinates, a set of GPS coordinates, a store front identified in an image, or a corporate logo.

6. The system of claim 1 wherein the system is configured such that the value item is kept secret from the second, mobile recipient user computing device until after the second, recipient user mobile computing device is in the designated range of the specific physical location.

7. The system of claim 6 wherein the value item is kept secret from the second, recipient user mobile computing device until after the second, recipient user mobile computing device triggers the triggering icon.

8. The system of claim 1 wherein the system is configured to lead the second, recipient user to the specific physical location by providing multiple clues to the second, recipient user mobile computing device each lead closer to the specific physical location.

9. The system of claim 1 wherein the system is configured such that a getting warmer signal is provided to the second, recipient user mobile computing device when the second, recipient mobile user computing device is located within a specific physical distance to the specific physical location.

10. The system of claim 1 wherein the system is configured such that a success signal is provided to the second, recipient user mobile computing device when the second, recipient user mobile computing device arrives at the specific physical location.

11. The system of claim 10 wherein the success signal comprises a success icon.

12. The system of claim 11 wherein the success icon comprises at least one of an image of a treasure chest or a corporate logo.

13. The system of claim 11 wherein the success icon comprises a 3D image.

14. The system of claim 13 wherein the 3D image requires manipulation by the second recipient user to be opened, whereby the value item is then exposed to the second user via such opening.

15. The system of claim 13 wherein the 3D image is displayed as a superimposed element over the real world view of the specific physical location displayed on the second, recipient user mobile computing device.

16. The system of claim 10 wherein:
upon accessing the success signal, the system receives notification that the triggering icon has been triggered and the second, recipient user is then awarded the value item and can use it to obtain a real world item.

17. The system of claim 16 wherein the second, recipient user obtains the real world item by at least one of redeeming the value item at a vendor located at the specific physical location or purchasing physical goods at a vendor located at the specific physical location.

18. The system of claim 1 wherein the system is configured for one or more human providers to leave value items at one or more specific physical locations for one or more other human recipients.

19. The system of claim 1 wherein the system is configured for a commercial entity to provide an incentive to customers or potential customers to utilize or purchase services or goods from the commercial entity.

20. The system of claim 1 wherein the system is configured such that at least one of the triggering icon or the value item is associated with the specific physical location and further comprising associating a security device with the at least one triggering icon or the value item that assures only a desired user can access the at least one triggering icon or value item.

21. The system of claim 20 wherein the security device is a PIN number.

22. The system of claim 20 wherein the security device is a password shared by the first, provider user and the second, recipient user.

23. The system of claim 20 wherein the security device is a biometric identifier associated with the second recipient user.

24. The system of claim 23 wherein the biometric identifier is at least one of a fingerprint, an iris print or a facial image of the second recipient user.

25. A non-transitory computer readable medium containing instructions for controlling one or more computing devices to perform a method comprising:
under control of a first computing device of a provider user, identifying a specific physical location and associating a triggering icon representing a value item with the specific physical location; and,
under control of a second, mobile computing device of a recipient user,
receiving an indication of the existence of the value item and/or the specific physical location;
detecting via a sensor on the second, mobile computing device that the second, mobile computing device is in a designated range of the specific physical location;
responsive to the detection, displaying, the triggering icon on the second, mobile computing device using augmented reality such that a display of a portion of a real world location is augmented with a display of the triggering icon;
wherein, upon receiving notification that the triggering icon has been triggered by the second, mobile computing device, the recipient user receives the value item.

26. A method comprising:
under control of a first computing device of a provider user, identifying a specific physical location and associating a triggering icon representing a value item with the specific physical location; and,
under control of a second, mobile computing device of a recipient user,
receiving an indication of the existence of the value item and/or the specific physical location;
detecting via a sensor on the second, mobile computing device that the second, mobile computing device is in a designated range of the specific physical location;
responsive to the detection, displaying the triggering icon on the second, mobile computing device using augmented reality such that a display of a portion of a real world location is augmented with a display of the triggering icon;
wherein, upon receiving notification that the triggering icon has been triggered by the second, mobile computing device, the recipient user receives the value item.

27. A non-transitory computer-readable medium containing instructions that control a processor of a mobile device to perform a method comprising:
receiving an indication of the existence that a specific physical location has been associated with a triggering icon by a first provider user computing device;
detecting via a sensor of the mobile device that the mobile device is in a designated range of the specific physical location;
responsive to the detecting, displaying the triggering icon associated with the specific physical location using augmented reality such that display of a portion of a real world location is augmented with display of the triggering icon; and
exposing a value item associated with a real world item upon activation and/or opening of the triggering icon.

* * * * *

UNITED STATES PATENT AND TRADEMARK OFFICE
CERTIFICATE OF CORRECTION

| | | |
|---|---|---|
| PATENT NO. | : 9,626,070 B2 | Page 1 of 1 |
| APPLICATION NO. | : 14/348422 | |
| DATED | : April 18, 2017 | |
| INVENTOR(S) | : Jonathan Cowles et al. | |

It is certified that error appears in the above-identified patent and that said Letters Patent is hereby corrected as shown below:

On the Title Page

Item (54), and in the Specification, Column 1, third line of the title of the invention, insert --and-- between "sensing" and "methods".

In the Claims

In Column 12, Line 26, Claim 1, remove the ",".

In Column 12, Line 35, Claim 1, insert --and-- after the ";".

In Column 14, Line 10, Claim 25, remove the "," after "and".

In Column 14, Line 18, Claim 25, insert --and-- after the ";".

In Column 14, Line 19, Claim 25, remove the second ",".

In Column 14, Line 30, Claim 26, remove the ",".

In Column 14, Line 38, Claim 26, insert --and-- after the ";".

Signed and Sealed this
Fourth Day of July, 2017

Joseph Matal
*Performing the Functions and Duties of the
Under Secretary of Commerce for Intellectual Property and
Director of the United States Patent and Trademark Office*